(12) United States Patent
Cheng

(10) Patent No.: US 7,626,965 B2
(45) Date of Patent: Dec. 1, 2009

(54) JOINT CELL DETECTION METHOD IN TD-SCDMA SYSTEM

(75) Inventor: Jian Cheng, Nanjing (CN)

(73) Assignee: Spreadtrum Communications Inc., George Town, Grand Cayman (KY)

( * ) Notice: Subject to any disclaimer, the term of this patent is extended or adjusted under 35 U.S.C. 154(b) by 725 days.

(21) Appl. No.: 11/442,247

(22) Filed: May 26, 2006

(65) Prior Publication Data

US 2006/0268810 A1    Nov. 30, 2006

(30) Foreign Application Priority Data

May 27, 2005    (CN) .................. 2005 1 0026254

(51) Int. Cl.
*H04B 7/216* (2006.01)

(52) U.S. Cl. ...................... 370/335; 370/252

(58) Field of Classification Search .......... 370/252, 370/328, 335, 338, 342, 441
See application file for complete search history.

(56) References Cited

U.S. PATENT DOCUMENTS 5,933,768 A * 8/1999 Skold et al. ............... 455/296
7,289,552 B2 * 10/2007 Kwak et al. ............... 375/147
7,336,599 B2 * 2/2008 Hwang et al. ............. 370/208
7,554,956 B2 * 6/2009 Kang et al. ............... 370/335
2002/0075832 A1 * 6/2002 Kim et al. ................. 370/335

* cited by examiner

*Primary Examiner*—Ricky Ngo
*Assistant Examiner*—Christine Ng

(57) ABSTRACT

Midamble codes, acting as channel estimation, and information data, as well as system information, will be sent to the joint cell detector. Midamble codes are sent to the estimator of adjacent cell, as well as that of its own cell. As a matter of fact, channel response is sent to channel noise-depressed modules to be depressed. Then the depressed channel is sent to channel window activation detector to receive first activation detection, to see whether the channel windows are activated. Channel response, after detected by channel window, will be sent to multi-user jointed detection unit together with information data. The soft bit information, after having been demoduled or detected, will be transmitted to the following Transport Channel Decoding (TrCH) modules and Channel Decoding (CC) modules. This invention solves the technical problems, that is, interferences received by the user equipments in inter-frequency network from its own cell and the adjacent cells, and to combat the problems of low capacity and handovers.

5 Claims, 2 Drawing Sheets

JOINT CELL DETECTION METHOD IN TD-SCDMA SYSTEM

FIELD OF THE INVENTION

The present invention relates to a method for reducing complexity in mobile communications, and more particularly, relates to a joint cell detection method in a TD-SCDMA communications system.

BACKGROUND

Code division multiple access systems, such as TD-SCDMA, are interference-restricted systems, in which the correlation of the users' spreading codes leads to MAI (multiple access interference) among the users. In the traditional receiving detection method, signal from other users are noise. However, with an increase in users, MAI becomes a large portion of the noise. As a result, the capacity of the system is restricted. Meanwhile, multi-path effects of the wireless channel will cause ISI (inter-symbol interference) among the codes.

A TD-SCDMA system can be an intra-frequency network, or inter-frequency network. When it is an inter-frequency network, multiple access of several cells is realized by frequency division. When it is intra-frequency, it is realized by compounded spreading codes—Walsh codes and scrambling codes.

In the case of an intra-frequency network, at the conjunct borderline of several cells (e.g. 2 or 3 cells), user equipment will receive interference either from its own cell, or from the other cells. The interference of its own cell can be fully utilized when joint-detected by the receiver and inflict little influence on the receptivity. However, if it is not counteracted, or joint-detected, the interference from the other cells (especially the adjacent cells) might disable the receptivity of the receiver. As such, the capacity and successful hand-over of the system might be decreased to a great extent.

SUMMARY OF THE INVENTION

A detection method for joint cells in a TD-SCDMA system is disclosed, in order to address interference received by the user equipment in an intra-frequency network from its own cell and the adjacent cells, and to combat the problems of low capacity and handovers.

The features of the joint cell detection method are as follows: Midamble codes, acting as channel estimation, are sent to the joint cell detector, with information data, as well as system information. Midamble codes are sent to the channel estimator of an adjacent cell, as well as that of its own cell. Channel response is sent to the channel noise-depressed modules to be suppressed. Then the depressed channel response is sent to a channel window activation detector for first activation detection, to see whether the channel windows are activated or not. Channel response, after detected by channel window, will be sent to multi-user detection unit together with information data. The soft bit information, after having been demodulated or detected, will be transmitted to the Transport Channel Decoding (TrCH) modules and Channel Decoding (CC) modules.

Midamble codes, for channel estimation, and information data, are created such that analog baseband signals, from the analog baseband, are sent to analog-digital converter (ADC) and converted to digital signals, which are sent to a matched filter. Consequently, the filtered data are transmitted to the data split modules and split into Midamble codes, for channel estimation, and information data, and for user data detection.

In one embodiment, this matched filter can be a finite impulse response filter, which employs root raised cosine (RRC) finite impulse response (FIR), with a roll-off coefficient $\alpha=0.22$.

This noise-depressed process is to be compared with noise threshold in order to depress the noise. Further, this process makes use of a path search, which is similar as in a WCDMA system.

The receiving signal is $r=As+n$, where the receiving signal is $r=[r_1, r_2, \ldots, r_{352+W-1+D}]^T$. Herein w is the width of the channel window (e.g. w is 16) and D is channel transmission delay between two cells and mobile terminals (compared with 1.28 Mcps). The sending signal S is such that $s=[(s_1^1)^T, \ldots, (s_1^{L_c})^T, \ldots, (s_N^1)^T, \ldots, (s_N^{L_c})^T]^T$. Herein $L_c$ is the number of the cells, which need joint detection. $s_{i,j}^l$ is the $j^{th}$ sending signal on the $i^{th}$ code in the $l^{th}$ cell, while n is Gaussian noise

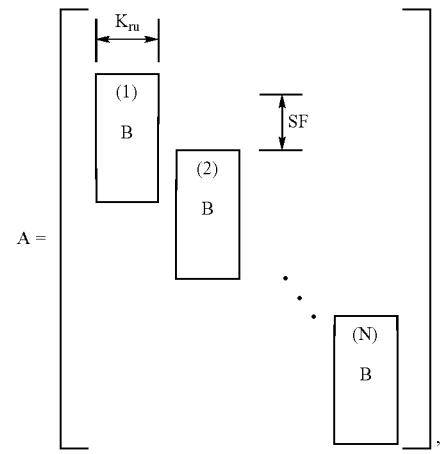

SF is the spreading factor. When it is a downlink, SF is 16, while N, the number of signals on each code, is 22. Matrix B is formed from Matrix b, whose number is equal to that of the cells:

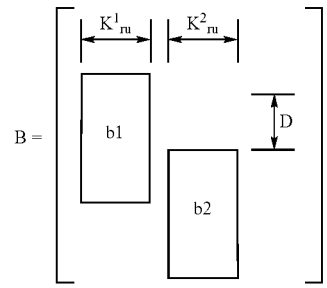

Herein $K_{ru}=K_{ru}^1+K_{ru}^2$ is the total of codes in two cells. Sub-matrix $b_1$ in Matrix B is indicated by the following formula.

$$b1 = \begin{bmatrix} b_{1,1} & \cdots & b_{K_{ru}^1,1} \\ b_{1,2} & \cdots & b_{K_{ru}^1,2} \\ \vdots & \ddots & \vdots \\ b_{1,SF+W-1} & \cdots & b_{K_{ru}^1,SF+W-1} \end{bmatrix}$$

After the channel windows activation detection, the convolution of these channel windows from several cells, and the corresponding multiple access codes, which denote that codes multiply scrambling codes, can produce Matrix B in the multi-user detection unit. The correspondence between channel windows and codes is in the appendix of 3GPP Release4 25.221. Compound channel match filter will fulfill the operation of Matrix $A^H r$. Code activation detection reconstructs the signal $A^H r$, which have been match filtered in the compound channel match filter just like the reconstruction of codes. Simultaneously, the power of the code is generated and a threshold is created. If the power of codes surpasses the threshold, this code can be activated. Otherwise, it is not activated. After the activated code is decided, code numbers will generate units to list the code number, activated or not. This code number will be sent to the reconstruction unit of Matrix B, retaining or deleting the corresponding columns of Matrix B, which originate from Matrix B generation modules. Meanwhile, code numbers, detected by units, which are generated by codes, will be transported to reconstruction units of compound channel match filter and then retain or delete the receiving signals after the process of match filter, according to the code numbers after the activation. The reconstructed Matrix B will be sent to Correlation Matrix R generation units in order to get Correlation Matrix R. The formula is $R_{ZF}=A^H A$ or $R_{MMSE}=A^H A+\sigma^2 I$. In this formula, $R_{ZF}$ is the correlation matrix of zero-forcing algorithm; $R_{MMSE}$ is Minimum Mean Square Error; $\sigma^2$ is noise power, which can be generated from measurement modules; I is a unit matrix. $R^{-1}(A^H r)$ should be realized in order to fulfill the relative multi-user detection. $A^H r$ is the match filter signal after reconstruction.

In the process of the correlative multi-user detection, Correlation matrix R can have Cholesky decomposition and change into multiplication of two triangular matrices such that $R=HH^H$, in that H is a lower triangular matrix in order to simplify the inverse operation of correlation matrix R, which has the features: $R^H=(A^H A)^H=A^H A=R$.

This invention takes into consideration the information of several adjacent cells, and then sends it to joint detection. Therefore, the performance is improved to a great extent. This technique applies not only to the mobile terminals of downlink receiving, but also to Node B of uplink receiving.

DETAILED DESCRIPTION OF THE PREFERRED EMBODIMENT

Figure 1:
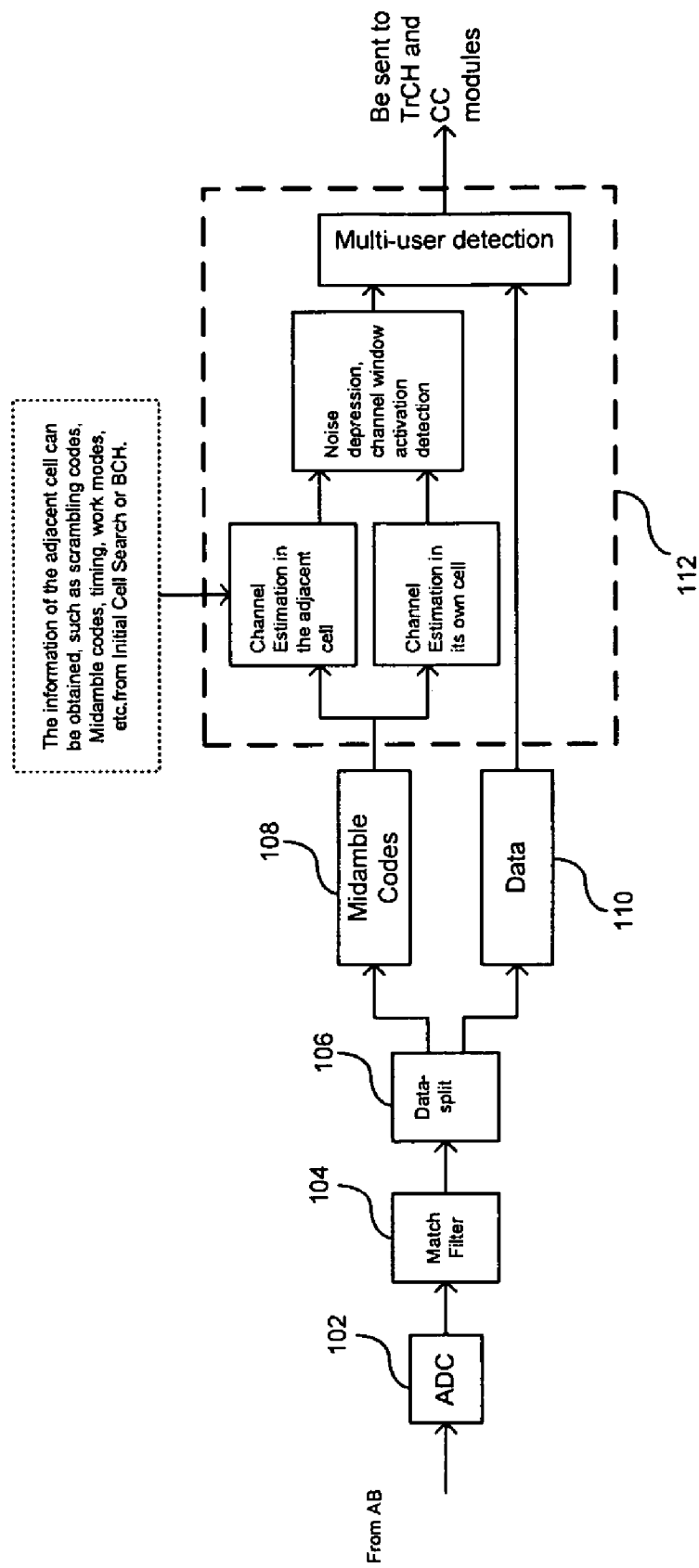
FIG. 1 is a schematic diagram of a receiver using joint cell detection.

FIG. 1 illustrates a terminal receiver using joint cell detection according to the present invention. An analog baseband signal, from Analog Baseband (AB), is sent to Analog-Digital Converter (ADC) 102 and is then changed into a digital signal, which in turn is sent to Match Filter 104 (MF). The match-filter pulse-shape filters the signals on the transmitting end. In a 3G system, pulse-shaping filter on the sending end and match filter on the receiving end employ Root Raised Cosine (RRC) Finite Impulse Response (FIR) filters, with a roll-off coefficient $\alpha=0.22$. The data after the match filter will be sent to data split modules 106 and is split into Midamble codes 110, used for channel estimation, and information data 108. Midamble codes and information data 110 and 108, combined with system information 114, will be transported to joint cell detector 112 and produce soft bits, which in turn are sent to Transport Channel Decoding (TrCH) modules and Channel Decoding (CC) modules. Therefore, original bit information is generated.

Figure 2:
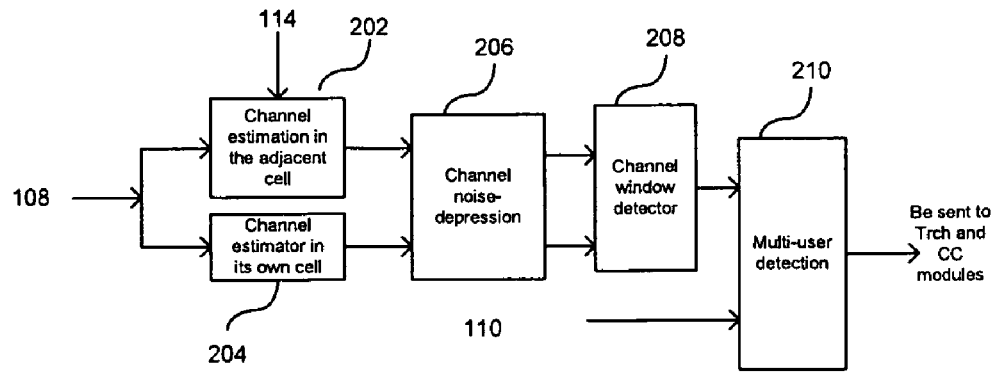
FIG. 2 is a schematic diagram of the detector used in joint cell detection.

The detailed description of joint cell detector 112 can be illustrated in FIG. 2: Midamble codes 108 in FIG. 1 are sent to the channel estimator 202 of the adjacent cell and channel estimator 204 of its own cell. Therefore, the channel of the adjacent cell, as well as that of its own cell, can be estimated. However, the number of the estimated channel of the adjacent cell may not be defined to be one, since this result is controlled by the information of the adjacent cell, and the estimation 114 of mobile terminals. Channel response, estimated from channel estimator 202 of adjacent cell, as well as channel estimator 204 of its own cell will be sent to channel noise-suppression module 206. Alternatively, a path search as usually used in WCDMA can be utilized here. The channel, whose noise is suppressed by channel noise-suppression module 206, will be sent to channel window activation monitor 208 to be checked for activation. Channel response after channel window activation, together with information data in FIG. 1, will be sent to multi-user detection unit 210. Soft bits after demodulation will be sent to the TrCH and CC.

Figure 3:
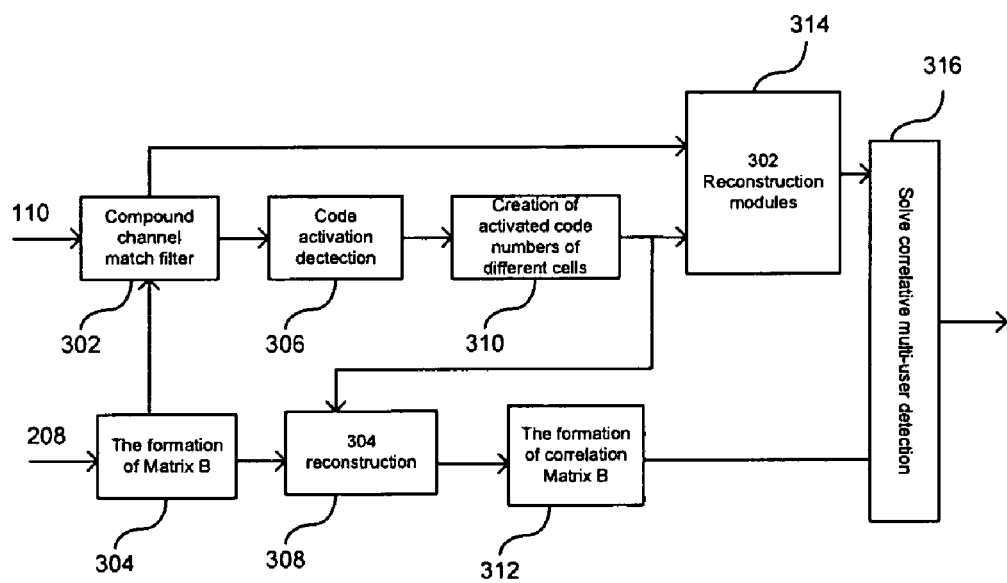
FIG. 3 is a schematic diagram of a multi-user detection module used in joint cell detection.

Multi-user detection 210 in FIG. 2 is shown in detail in FIG. 3. The model of the receiving signal as $r=As+n$ is useful for a clear understanding of FIG. 3.

Receiving signal r is such that $r=[r_1, r_2, \ldots, r_{352+W-1+D}]^T$, in that w is the width of channel window. In one embodiment, w is 16 and D is the channel transport delay between two cells and mobile terminals (compared with 1.28 Mcps), which can be computed from channel estimation of the two cells, or cell search module. The sending signal S is such that $s=[(s_1^1)^T, \ldots, (s_1^{L_c})^T, \ldots, (s_N^1)^T, \ldots, (s_N^{L_c})^T]^T$. Herein $L_c$ is the number of the cells that need joint detection. $s_{i,j}^l$ is the $j^{th}$ sending signal on the $i^{th}$ code in the $l^{th}$ cell, while n is Gaussian Noise

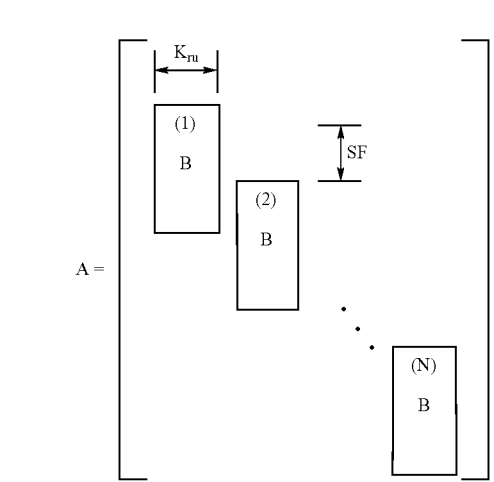

SF is the spreading factor. When it is a downlink, SF is 16, while N, the number of signals on each code, is 22. From the diagram of Matrix A, Matrix A can be made up of Matrix B.

The following is an example of Matrix B with two cells. If there are more than two cells, which are near to one another, the number of Matrix b in the corresponding Matrix B should be equal to that of the cells.

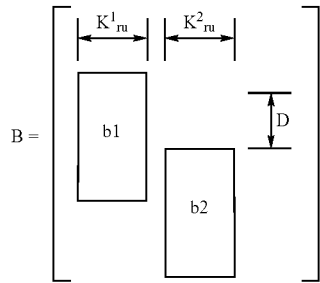

Herein $K_{ru}=K_{ru}^1+K_{ru}^2$ is the total of codes in two cells, Sub-matrix $b_1$ in Matrix B is indicated by the following formula.

$$b1 = \begin{bmatrix} b_{1,1} & \cdots & b_{K_{ru}^1,1} \\ b_{1,2} & \cdots & b_{K_{ru}^1,2} \\ \vdots & \ddots & \vdots \\ b_{1,SF+W-1} & \cdots & b_{K_{ru}^1,SF+W-1} \end{bmatrix}$$

After the channel window activation detection, the convolution of these windows in several cells, and the corresponding multiple access codes, which denote that codes multiply scrambling codes, can produce Matrix B 302 in FIG. 3 in the Multi-user detection unit. Compound channel match filter 304 will fulfill the operation of Matrix $A^H r$. Code activation detection 308 is to reconstruct the signal $A^H r$, which have been match filtered in the compound channel match filter 304 just like the reconstruction of codes. Simultaneously, the power of the code is generated and a threshold is created. If the power of the codes surpasses the threshold, this code is decided as activated. Otherwise, it is not activated. After the activated code is decided, code number will generate units 312 to list the code number, activated or not. This code number will be sent to reconstruction unit 306 of Matrix B, retaining or deleting the corresponding columns of Matrix B, which originate from Matrix B generation modules. Meanwhile, code numbers, detected by units 312, which are generated by codes, will be transported to reconstruction units 312 of compound channel match filter 304 and then retain or delete the receiving signals after the process of match filter, according to the code numbers after the activation. The reconstructed Matrix B from 306 will be sent to Correlation Matrix R to generate units in order to get Correlation Matrix R. The formula is $R_{ZF}=A^H A$ or $R_{MMSE}=A^H A+\sigma^2 I$. In this formula, $R_{ZF}$ is the correlation matrix of zero-forcing algorithm; $R_{MMSE}$ is Minimum Mean Square Error Algorithm; $\sigma^2$ is noise power, which can be generated from measuring modules; I is unit matrix. $R^{-1}(A^H r)$ should be realized in order to fulfill the relative multi-user detection. $A^H r$ is match filter signal after reconstruction.

Since the correlation matrix has the following feature: $R^H=(A^H A)^H=A^H A=R$, it should have Hermite characteristic. Therefore, in order to solve the problem of correlative multi-user detection 316, correlation matrix R can have Cholesky decomposition and change into multiplication of two triangular matrices such that $R=HH^H$, in that H is a lower triangular matrix, in order to simplify the inverse operation of correlation matrix R, which has the features: $R^H=(A^H A)^H=A^H A=R$.

What is stated above is just an example of the embodiments of this invention, and is not meant to be restricting on the scope of the present invention. Any equivalent modification or adjustment of the scope of the invention falls within the scope of the present invention.

What is claimed is:

1. A joint cell detection method in a TD-SCDMA system, comprising:
    sending midamble codes, acting as a channel estimation, to a joint cell detector;
    sending information data as well as system information to said joint cell detector;
    providing said midamble codes to an estimator of an adjacent cell and to an estimator of a primary cell;
    providing a channel response to a channel noise-suppression module that outputs a suppressed channel response;
    sending said suppressed channel response to a channel window activation detector to determine if channel windows are activated;
    sending said suppressed channel response to a multi-user detection unit together with the information data; and
    transmitting soft bit information, after having been demodulated, to the a transport channel decoding modules and channel decoding modules.

2. The method of claim 1 further comprising the steps of:
    creating the midamble codes and information data by:
    converting analog baseband signals into digital signals, which are sent to a match filter; and
    transmitting the filtered data from the match filter to data split modules that separate the midamble codes for channel estimation from the information data.

3. The method of claim 2 wherein the match filter is a finite impulse response filter, which employs Root Raised Cosine (RRC) Finite Impulse Response (FIR), with a roll-off coefficient of about $\alpha=0.22$.

4. The method of claim 1 wherein the noise suppression process includes comparing a noise threshold to a suppressed noise.

5. The method of claim 1 wherein the noise suppression process uses a path search of a WCDMA system.

* * * * *